Jan. 6, 1953    M. A. HERLIN ET AL    2,624,864
TUNABLE MULTICAVITY TYPE MAGNETRON TUBE
Filed Dec. 10, 1945    2 SHEETS—SHEET 1
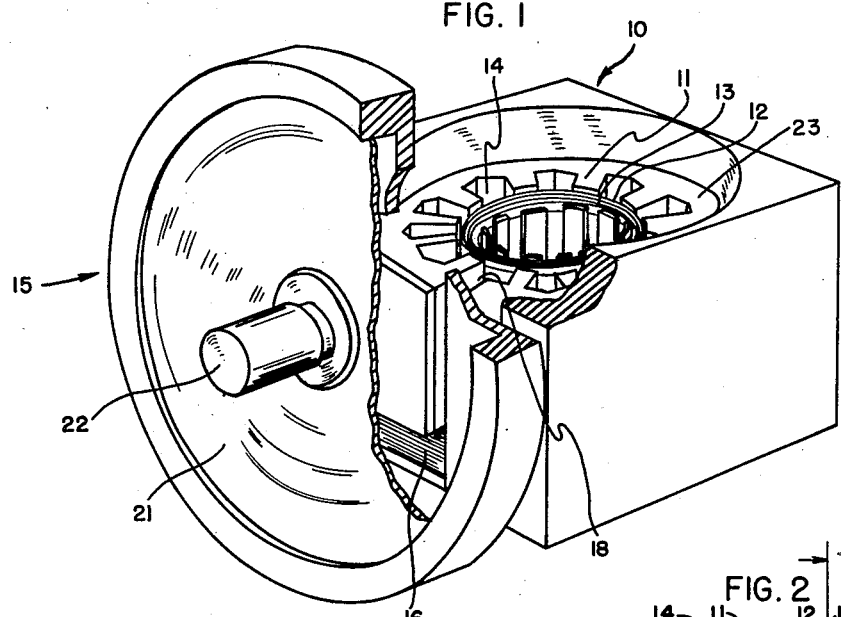
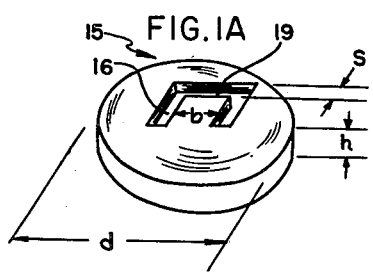
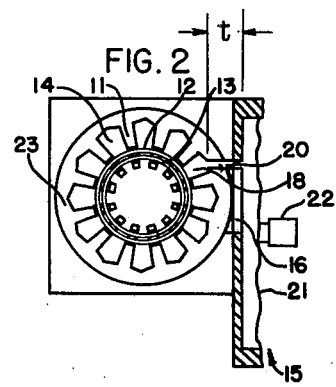
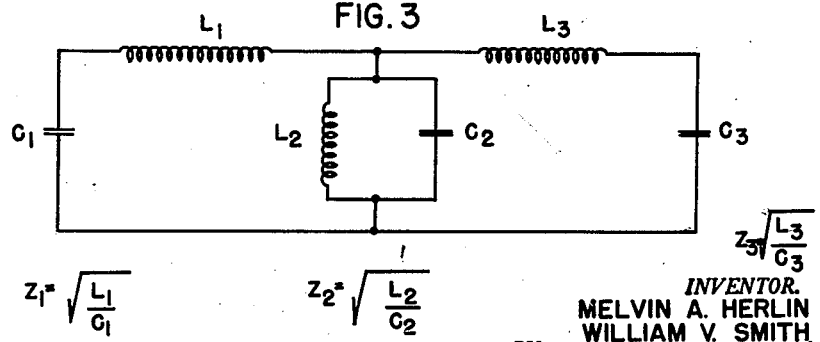
INVENTOR.
MELVIN A. HERLIN
WILLIAM V. SMITH
BY
*William D. Hall.*
ATTORNEY Patented Jan. 6, 1953

2,624,864

UNITED STATES PATENT OFFICE 2,624,864

TUNABLE MULTICAVITY TYPE MAGNETRON TUBE

Melvin A. Herlin, Cambridge, and William V. Smith, Medford, Mass., assignors, by mesne assignments, to the United States of America as represented by the Secretary of War Application December 10, 1945, Serial No. 634,069

5 Claims. (Cl. 315—40)

This invention relates to electrical apparatus and more particularly to tunable magnetrons.

In one type of tunable magnetron, an external tunable cavity resonator is coupled to one of the cavities of a plural cavity magnetron by means of a resonant aperture. If this cavity resonator stores an appreciable fraction of the total energy stored in the combination of magnetron and cavity resonator, a change in the resonant frequency of the cavity resonator will result in some smaller change of the frequency of the cavity resonator-magnetron combination. The stabilization factor S is a measure of the relative energy storages of resonator and magnetron. The stabilization factor S is defined in the following equation:

(1) $$S \equiv \frac{\text{Stored energy in resonator and magnetron}}{\text{Stored energy in magnetron alone}}$$

The symbol "≡" means "is defined as."

The tuning range of the resonator-magnetron combination is a function of the stabilization factor S, as indicated in the following equation:

(2) $$\frac{\Delta F}{\Delta f} = \frac{S-1}{S}$$

where $\Delta F$ is the frequency change of the resonator-magnetron combination corresponding to a frequency change $\Delta f$ of the resonator alone.

The addition of a tunable cavity resonator to the magnetron in this fashion results in the introduction of new and extraneous modes of oscillation in addition to the desired pi-mode of oscillation for the magnetron. The pi-mode of oscillation in the magnetron is that mode in which the alternate anode segments (forming the walls of the various individual cavities within the plural cavity magnetron) are positive and negative respectively.

One such tunable cavity resonator for tuning magnetrons has been designed in the past. This resonator stored by far the greater part of the total energy of the resonator-magnetron combination and therefore had a high stabilization factor S. The high stabilization factor was accompanied by a strong tendency of the magnetron to operate in one of the aforementioned undesired modes. This tendency was suppressed by discriminating against the undesired modes with some preferential loading means. The use of such preferential loading was effective in discriminating against the undesired modes, but had the disadvantages of increased complexity and increased expense.

An important object of the present invention is to provide a tunable resonator-magnetron combination, the output of which is substantially free of these undesired modes of oscillation.

A further object of the invention is to provide a tunable resonator-magnetron combination with a substantial range of tuning (i. e. of the order of 10%).

A still further object is to provide a simple and inexpensive structure for accomplishing the aforementioned objects.

Other objects and advantages of the invention will be apparent during the course of the following description.

The attainment of the maximum tuning range, consistent with freedom from the undesired modes of oscillation, is made possible by designing the external tunable cavity resonator to have a relatively low energy storage. The cavity resonator is designed (for reasons which will be indicated hereinafter) to have a stabilization factor S (Equation 1) less than 3.

In the accompanying drawings forming a part of this specification and in which like numerals are employed to designate like parts throughout the same:

Fig. 1 is a broken-away isometric view of a tunable cavity resonator-magnetron combination embodying the principles of the present invention;

Fig. 1A is an isometric view of the cavity resonator and coupling aperture of Fig. 1 to a somewhat reduced scale;

Fig. 2 is a simplified sectional top view of Fig. 1 to a somewhat reduced scale;

Figure 4:
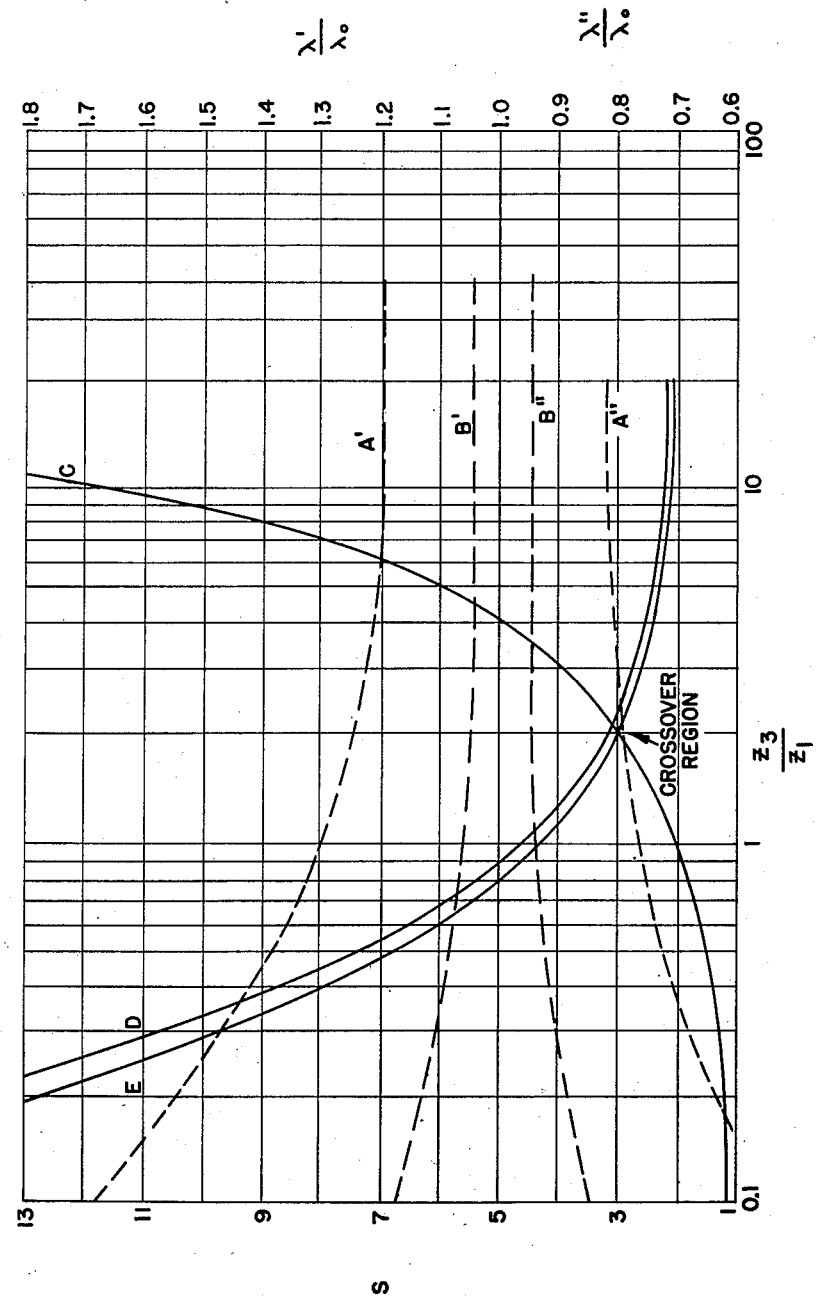

Fig. 3 is the equivalent electrical circuit of Fig. 1, the subscripts 1, 2, and 3 referring to the magnetron, coupling aperture and cavity resonator respectively; and Fig. 4 shows graphs of a. Stabilization factor S as a function of the parameters of Fig. 3 (solid line curves) and b. Relative mode wavelength $$\frac{\lambda}{\lambda_0}$$

as a function of the parameters of Fig. 3 (dashed line curves).

Referring to Fig. 1, numeral 10 designates a plural cavity magnetron containing a plurality of radial anode segments 11. Alternate anode segments 11 are connected by strap 12 and intermediate alternate segments are connected by strap 13. Anode segments 11 include therebetween the individual oscillator cavities 14 within magnetron 10. Numeral 23 designates a ring structure continuous with and joining the anode segments 11 at their outer terminations. An external tunable cavity resonator 15 is coupled to one of these magnetron oscillator cavities (i. e. 18) by means of a substantially C-shaped resonant coupling aperture 16. The aperture 16 has been shown C-shape (best shown in Fig. 1A), but other equivalent apertures, approximately resonant at the magnetron frequency, would be suitable.

The resonator 15 and coupling aperture 16 of Fig. 1 are shown in Fig. 1A drawn to a somewhat reduced scale. The resonator 15 is constructed to have a relatively small ratio of height $h$ to diameter $d$. The coupling aperture 16 extends through one end closure of the cavity resonator 15.

Referring to Fig. 2 which shows a simplified sectional top view of the cavity resonator-magnetron combination of Fig. 1, drawn to a somewhat reduced scale, coupling aperture 16 couples into the magnetron cavity 18 at a high current point 20. The cavity resonator 15 has a flexible diaphragm 21 for the end closure opposite the end closure containing the C-shaped aperture 16. Numeral 22 designates a stud attached to the diaphragm 21, said stud being adjustable to vary the geometry of the resonator 15 to provide tuning thereof.

The exact size, shape and dimensions of resonator 15 for a given type of magnetron are in general determined empirically. One method is as follows:

The C-shaped aperture 16 is cut in one end closure of resonator 15, and through the ring structure 23 of magnetron 10 to approximate dimensions determined as follows:

$$(3) \quad S = \frac{\sqrt{A_L \cdot A_C}}{0.15 \lambda^2}$$

where S is the slot width (see Fig. 1A), $A_L$ is the sum of the areas of the side arms of the C (Fig. 1A), $A_C$ is the area of the metal facing of gap 19 (i. e. $A_C = bt$), where $b$ is the dimension between the side arms of the C (Fig. 1A) and $t$ the slot depth (Fig. 2), and $\lambda$ is the operating wavelength.

The exact dimension of the aperture 16 is determined by adjusting the aperture 16 until the separation between the pi-mode and the undesired modes is greater than the desired tuning range.

The correctness of the dimensions of cavity resonator 15 is checked as follows:

Tuning curves of cavity resonator 15 alone, indicating $\Delta f$ (Equation 2) as a function of the motion of stud 22, and of the resonator-magnetron combination indicating $\Delta F$ (Equation 1) as a function of the motion of stud 22, are plotted. As will be described in detail hereinafter, it is desirable to have a stabilization factor S of from 1 to 3 with an optimum value of 2. This indicates that the ratio $$\frac{\Delta F}{\Delta f} \leq 0.67 \text{ (Equation 2)}$$

If this relation is not satisfied empirically, it is necessary to decrease the relative energy storage of resonator 15, and this may be done by designing it with a somewhat smaller $$\frac{h}{d}$$

ratio, or, in general, with a somewhat smaller Q. While the resonator 15 is here shown as having a pill-box like construction (i. e. cylindrical with a small ratio of height to diameter) it is obvious that any equivalent cavity resonator of other shape and dimensions, but having substantially the same energy storage characteristics, may be substituted.

The actual value of S for a given resonator-magnetron combination may be determined from the tuning curves. From Equation 1:

$$(4) \quad S = \frac{\Delta f}{\Delta f - \Delta F}$$

The operational features of the tunable magnetron embodying the present invention are as follows:

The frequency of the plural cavity magnetron 10 may be varied by coupling the external tunable cavity resonator 15 to one of the individual cavities within magnetron 10 (i. e. cavity 18) by means of the resonant coupling aperture 16.

The following design features of the cavity resonator 15 and coupling aperture 16 are included to better satisfy the requirement that there be a relatively low storage of energy within resonator 15:

a. Resonator 15 has a relatively small ratio of height to diameter (relatively low Q).

b. The C-shaped aperture 16 is not centered in the end closure of resonator 15 but is almost entirely in a semi-circular portion of the end closure. The C-shaped aperture 16 occupies substantially the maximum current region of the electromagnetic field within resonator 15. The aperture 16 couples into cavity 18 of magnetron 10 at the high current point 20. The current at point 20 will correspond to the maximum current within resonator 15 (the current intensity within resonator 15 decreasing beyond this point) and hence the storage of energy within resonator 15 is minimized.

The coupling aperture 16 is made large to displace the energy of the extraneous undesired modes. This has been the reason for placing the aperture in the end closure of the cylindrical resonator 15 rather than in its side wall.

The end closure of the cavity resonator 15 opposite the end closure having coupling aperture 16 is a movable diaphragm 21, the position of which is variable by means of the stud 22. The adjustment of stud 22 serves to vary the resonant frequency of the cavity resonator 15 thereby varying the frequency of the radio frequency output of magnetron 10.

The equivalent electrical circuit for the apparatus of Figs. 1, 1A and 2 is shown in Fig. 3.

L is the equivalent inductance, C the equivalent capacitance and Z the characteristic impedance, the subscripts 1, 2 and 3 referring to the magnetron 10, coupling aperture 16 and cavity resonator 15 respectively.

The equivalent circuit of Fig. 3 may be solved and indicates the existance of three resonant frequencies or corresponding wavelengths:

a. The desired pi-mode wavelength $\lambda_0$
b. An upper undesired mode wavelength $\lambda'$
c. A lower undesired mode wavelength $\lambda''$ $\lambda'$ and $\lambda''$ are functions of the parameters of the equivalent circuit of Fig. 3, and are plotted on Fig. 4, curves A', B', A'' and B''.

Curve A' (Fig. 4) is a graph of $\frac{\lambda'}{\lambda_0}$ as ordinate vs. $\frac{Z_3}{Z_1}$ as abscissa for $\frac{Z_2}{Z_1}=0.14$.

Curve A'' is a graph of $\frac{\lambda''}{\lambda_0}$ as ordinate vs. $\frac{Z_3}{Z_1}$ as abscissa for $\frac{Z_2}{Z_1}=0.14$.

Curve B' is a graph of $\frac{\lambda'}{\lambda_0}$ as ordinate vs. $\frac{Z_3}{Z_1}$ as abscissa for $\frac{Z_2}{Z_1}=0.01$.

Curve B'' is a graph of $\frac{\lambda''}{\lambda_0}$ as ordinate vs. $\frac{Z_3}{Z_1}$ as abscissa for $\frac{Z_2}{Z_1}=0.01$.

The stabilization factor (Equation 1) for the pi-mode (wavelength $\lambda_0$) will in general be different from the stabilization factor for the upper and lower modes (wavelengths $\lambda'$ and $\lambda''$).

Curve C (Fig. 4) is a plot of the $\lambda_0$ stabilization factor S as ordinate vs. $\frac{Z_3}{Z_1}$ as abscissa.

Curve D is a plot of the $\lambda'$, $\lambda''$ stabilization factor S as ordinate vs. $\frac{Z_3}{Z_1}$ as abscissa for $\frac{Z_2}{Z_1}=0.14$.

Curve E is a plot of the $\lambda'$, $\lambda''$ stabilization factor S as ordinate vs. $\frac{Z_3}{Z_1}$ as abscissa for $\frac{Z_2}{Z_1}=0.01$.

Curves A', A'', B' and B'' show that the mode separation is strongly dependent on the value of $\frac{Z_2}{Z_1}$.

Curves D and E show that the stabilization factor S is however only slightly dependent on the value of $\frac{Z_2}{Z_1}$.

The crossover region (at which the stabilization for the center mode equals that of the two extraneous modes) occurs at an approximate stabilization factor $S=3$, over a wide range of values for $$\frac{Z_2}{Z_1}$$

Operation in a mode other than the desired pi-mode is generally associated with an excessive storage of pi-mode energy within cavity resonator 15, consequently impeding the build-up of pi-mode oscillations within magnetron 10. To minimize this undesired operation, it is necessary that the cavity resonator 15 have a lower storage of energy at the pi-mode than at the upper and lower extraneous modes. This is equivalent to requiring that the stabilization factor S for the desired pi-mode shall be less than the stabilization factor for the upper and lower undesired modes. The stabilization factor S for the pi-mode must then be less than 3 with an optimum value of 2.

From Equation 1, if S is less than 3, then the stored energy in the resonator is less than twice the stored energy in the magnetron.

Alternatively from Equation 1, if S is less than 3, then the stored energy in the resonator is less than two-thirds the stored energy in the combination of resonator and magnetron.

Because of the small stabilization factor S, the tuning range of resonator 15 is relatively great. A small motion of diaphragm 21 results in a fairly large change in the resonant frequency of resonator 15.

While there has been described what is at present considered to be the preferred embodiment of this invention, it will be obvious that various changes and modifications may be made therein without departing from the scope of the invention.

What is claimed is:

1. A tunable magnetron oscillator including a plural cavity magnetron having a plurality of individual oscillator cavities formed therein, a cavity resonator having substantially a cylindrical construction with a relatively small ratio of height to diameter, said resonator having an energy storage less than twice the energy storage of said magnetron, said resonator further having a substantially C-shaped resonant aperture in one end closure, said aperture coupling said cavity resonator to one of said oscillator cavities, a diaphragm constituting the other end closure of said resonator and means mounted on the outside of said diaphragm for moving said diaphragm thereby varying the frequency of said cavity resonator-magnetron combination.

2. A substantially cylindrical cavity resonator having a relatively small ratio of height to diameter, said resonator having one end closure having only one approximately resonant aperture therein, a diaphragm constituting the other end closure of said resonator and means for moving said diaphragm thereby tuning said resonator.

3. A substantially cylindrical cavity resonator having a relatively small ratio of height to diameter, said resonator having one end closure with a substantially C-shaped approximately resonant aperture therein, a diaphragm constituting the other end closure of said resonator, and means for moving said diaphragm to thereby tune said resonator.

4. A tunable magnetron oscillator including a plural cavity magnetron; a substantially cylindrical cavity resonator having a relatively small ratio of height to diameter; said resonator being resonant at a frequency in the vicinity of the frequency of oscillation of said magnetron; said resonator having one end closure having only one approximately resonant aperture therein, a diaphragm constituting the other end closure of said resonator and means for moving said diaphragm thereby tuning said resonator; and said resonator being coupled to a cavity of said magnetron through said aperture.

5. A tunable magnetron oscillator according to claim 4, wherein said aperture is positioned at a high current region of said cavity of said magnetron.

MELVIN A. HERLIN.
WILLIAM V. SMITH.

REFERENCES CITED

The following references are of record in the file of this patent:

UNITED STATES PATENTS

| Number | Name | Date |
| --- | --- | --- |
| 2,287,845 | Varian et al. | June 30, 1942 |
| 2,404,226 | Gurewitsch | July 16, 1946 |
| 2,408,237 | Spencer | Sept. 24, 1946 |
| 2,414,085 | Hartman | Jan. 14, 1947 |
| 2,445,282 | Slater | July 13, 1948 |
| 2,446,765 | Hartman | Apr. 12, 1949 |
| 2,501,052 | Herlin | Mar. 21, 1950 |